2,870,047
WELDING RODS AND METHOD OF MAKING SAME

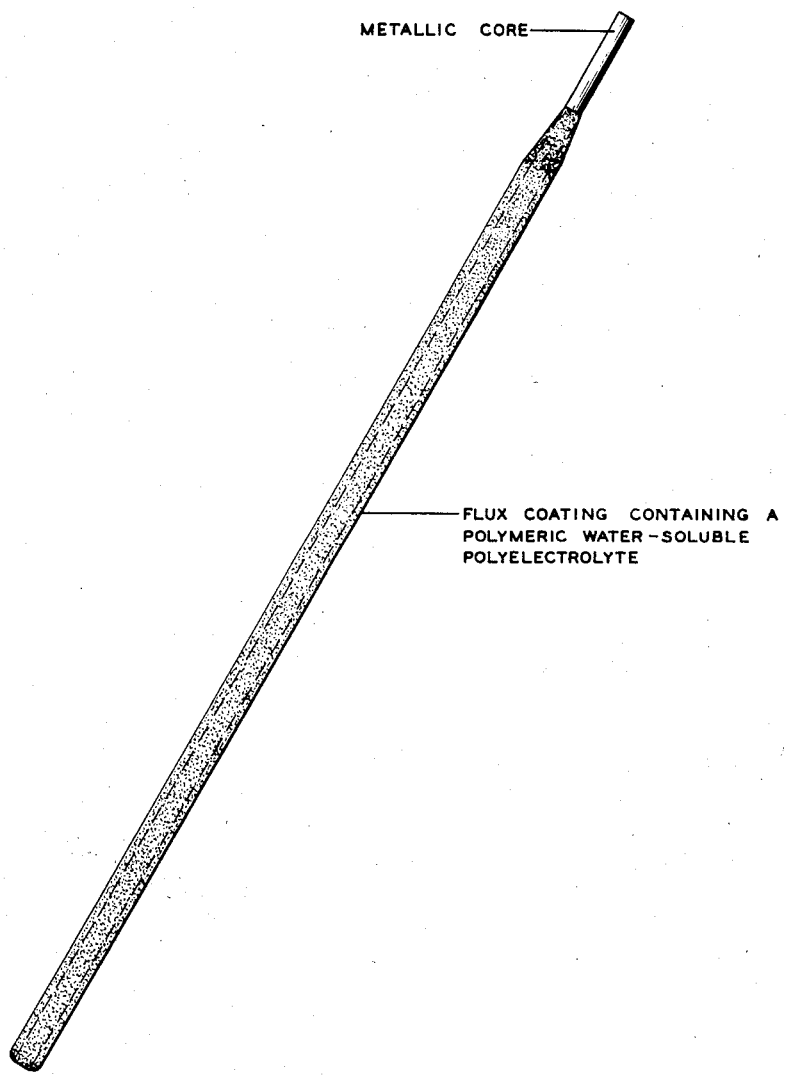

Leland M. Kee, Baltimore, Md., assignor by mesne assignments, to Air Reduction Company, Incorporated, New York, N. Y., a corporation of New York Application May 5, 1954, Serial No. 427,889

23 Claims. (Cl. 117—202)

This invention relates to arc-welding electrodes, coating compositions for such electrodes, and method of making same.

One of the major problems in the manufacture of extruded electrodes has been obtaining the proper mobility or extrusion characteristics of the electrode coating composition for maximum efficiency and optimum results in extrusion. The characteristics of the coating composition prior to extrusion have an important bearing upon the rate of extrusion and the quality of the welding rods produced. The mobility of the coating composition prior to extrusion is one of its most important properties. The mobility of the coating composition is determined by the water content, the nature of the solids, i. e. the particle size and other physical properties of the ingredients of the coating composition, and by certain chemical compounds which may be added.

While it may be simple to control the mobility of the electrode coating composition by merely changing its water content, there are certain disadvantages to the use of water alone for the control of mobility. If a large amount of water is necessary to make the coating composition mobile enough to extrude easily and properly, the shrinkage on drying will also be large and the tendency of the coating composition to crack and craze will be great.

It is an object of this invention to provide electrode coating compositions which are of optimum mobility for extrusion and yet will not be crack-sensitive.

It is a further object to provide more perfectly formed electrodes substantially free from cracks, indentations, and other defects.

Another object is to obtain the desired degree of mobility for the proper extrusion of the electrode coating composition with the use of less liquid binder than usually required.

Other objects will in part be obvious from, and will in part appear in, the following detailed description.

In accordance with this invention, it was discovered that by incorporating small amounts of one or more polymeric water-soluble polyelectrolytes in the electrode coating composition, the proper degree of mobility of the coating composition for optimum extrusion can be obtained. The mobility of the coating composition can be controlled without resorting to the use of an undesirable amount of liquid binder. In addition, the physical structure of the electrodes produced from coating compositions containing the polymeric water-soluble polyelectrolyte is greatly improved. The improved extrusion characteristics of the coating composition helps to keep the core wire concentric in the coating composition covering, and a uniformly thick coating is obtained. Use of the polymeric water-soluble electrolyte in the electrode coating tends to eliminate both drying and pressure cracks which would otherwise appear on the electrode covering. Furthermore, the presence of small amounts of the polymeric water-soluble polyelectrolyte improves the green strength of the electrode covering after extrusion and before baking, and thereby prevents damage to the covering when stripping the end of the electrode covering off the electrode. Improved green strength results in a decrease in the handling problems connected with the manufacture of electrodes. Indentations or bruises on the electrode are minimized. Another effect of the polymeric water-soluble polyelectrolyte is to decrease the thermoplasticity of the electrode covering, so that the electrodes do not readily sink on their carrying chains when baked in the oven, and indentations on the electrode covering from this source is thus decreased.

The term "polymeric water-soluble electrolyte" as used throughout the present disclosure and claims is to be construed in the same manner as it is defined and described in United States Patent No. 2,625,529 issued to Ross M. Hedrick and David T. Mowry on January 13, 1953. The polymeric water-soluble polyelectrolytes are those polymeric organic substances which, in an aqueous medium, will form organic ions having a substantial number of electrical charges distributed at a plurality of positions thereon. The term "water-soluble polymers," as used herein, would include those polymeric substances which not only form homogeneous mixtures with water, but also those materials which dissolve at least to some extent in the aqueous medium.

Polymeric water-soluble polyelectrolytes having a molecular weight of at least 10,000 and containing a substantially linear continuous carbon chain derived by the polymerization of an aliphatic unsaturated group are to be preferred as electrode coating composition additives and extrusion aids. These polymeric water-soluble polyelectrolytes have been sold under the trade names, Krilium, Lustrex X–886, and Lytron. Among the compounds which are useful in the practice of this invention are the polymers of acrylic acid, salts of hydrolyzed polymers of acrylonitrile, hydrolyzed polymers of acrylonitrile, polymers of methacrylic acid, salts of polymers of methacrylic acid, salts of hydrolyzed polymers of methacrylonitrile, hydrolyzed polymers of methacrylonitrile, salts of copolymers of unsaturated polycarboxylic acids and at least one other mono-olefinic monomer, salts of hydrolyzed copolymers of unsaturated polycarboxylic acid anhydrides and at least one other mono-olefinic monomer, hydrolyzed copolymers of unsaturated polycarboxylic acid anhydrides and at least one other mono-olefinic monomer, salts of copolymers of the partial alkyl esters of unsaturated polycarboxylic acids and at least one other mono-olefinic monomer, copolymers of unsaturated dicarboxylic acid anhydrides and at least one other mono-olefinic monomer, copolymers of the partial alkyl esters of unsaturated polycarboxylic acids and at least one other mono-olefinic monomer, salts of sulfonated polymers of hydrocarbons containing aliphatic unsaturation, sulfonated polymers of hydrocarbons containing aliphatic unsaturation, and polymers of amides containing aliphatic unsaturations.

While any of the aforementioned polymeric water-soluble polyelectrolytes may be employed, the preferred polyelectrolytes are the calcium salt of a hydrolyzed polymer of acrylonitrile, the sodium salt of a hydrolyzed polymer of acrylonitrile, the copolymer of vinyl acetate and the reaction product formed by partially esterifying maleic anhydride with methyl alcohol, and sulfonated polystyrene.

A further and more detailed description of all of the polyelectrolytes referred to above and their method of preparation appears in the aforementioned Hedrick and Mowry Patent No. 2,625,529.

The electrodes of this invention may be prepared in a number of ways. For example, the dry electrode coating composition containing the conventional welding flux ingredients in the desired proportions are thoroughly blended together in any of the conventional mixers, e. g. a Muller type mixer. The polymeric water-soluble electrolyte is incorporated in the dry coating composition mix, prior to blending. A binder containing the usual liquid binder ingredients, such as sodium silicate, is then prepared. The binder is then added to the dry ingredients while stirring. Blending is continued until a homogeneous mixture is obtained. This usually takes from 10 to 30 minutes. The wet mixed coating is then placed in any conventional electrode extrusion coating apparatus, e. g. an extrusion press, and applied under pressure to the core wire. An end of each of the coated core wires or green electrodes is stripped, exposing 1″ to 1½″ of bare core wire. The electrodes are then introduced into a drying oven where they are baked for about an hour, controlling the baking cycle to avoid cracking. A typical baking cycle would be drying at 190° F. for 20 minutes, at 240° F. for 20 minutes, and at 350° F. for 20 minutes.

The polymeric water-soluble polyelectrolytes of this invention can be added to, or be incorporated in, any of the usual electrode coating compositions. Such electrode coating compositions normally contain one or more of the following constituents: a slag former, such as feldspar (alkali aluminum silicates), clay aluminum silicates (e. g. bentonite or kaolin), talcs (magnesium silicates), titanates (rutile, titanium dioxide), iron oxides, calcium carbonates, asbestos, ferromanganese, potassium silicates or salt, and sodium silicate; an arc stabilizer, e. g. feldspar, clays, talcs, titanates, iron oxides, calcium carbonates, asbestos, potassium silicates or salt, sodium silicates; a reducing agent, such as gum and/or resin, cellulose, and ferromanganese; a binder such as gum and/or resin, potassium silicates or salt, sodium silicates; a coating strengthener, such as cellulose or asbestos; an oxidizing agent such as iron oxides, or calcium carbonate; a gas shielding agent such as cellulose or calcium carbonate; and an alloying weld metal such as ferromanganese or other metal alloy.

Any suitable amount of the polymeric water-soluble polyelectrolyte can be added to the electrode coating composition. Generally the amount of polyelectrolyte employed would vary from 0.01 to 2.0 percent by weight of the dry mix. Most applications would require about 0.25 percent by weight of the polyelectrolyte.

The metallic core of the welding rod may be any of the metals or alloys normally employed. For example, the core wire may be selected from any of the various mild steel grades, stainless steels, nickel, bronze, Monel, and others. The invention is especially applicable to welding rods falling into American Welding Society Classifications E–XX15 and E–XX16 and to welding rods containing stainless steel core wire. The diameter of the core wire may vary from 1/16″ to ½″. The thickness of the coating applied to the core wire may vary from about 0.010″ to about 0.250″.

In order to further illustrate the invention, but without being limited thereto, the following examples are given.

*Example I*

An electrode coating composition, for the AWS type E–7016 electrode, is prepared in the following manner.

A dry mix of welding fluxes was prepared by blending together, in a Muller type mixer, the following ingredients.

| Dry ingredients: | Percent of total weight of dry ingredients |
|---|---|
| Calcium carbonate | 20–55 |
| Fluorspar | 5–23 |
| Rutile | 5–25 |
| Potassium titanate | 5–20 |
| Mineral silicates | 1–5 |
| Feldspar | 5–20 |
| Ferro-silicon | 5–20 |
| Ferro-manganese | 4–12 |
| Sulfonated polystyrene (polymeric polyelectrolyte) | .01–2.00 |

To this dry mix sufficient liquid binder is added to the dry ingredients to give proper consistency for extrusion. The liquid binder is made up as follows:

| Liquid binder: | Percent of total binder weight |
|---|---|
| Sodium silicate | 30–60 |
| Potassium silicate | 40–70 |

Usually the quantity of liquid binder added will be about 20–30% by weight of the dry ingredients.

The liquid binder is homogeneously blended with the dry ingredients. The mixed coating is placed in an extrusion press and applied under pressure to a low-carbon, bright finish steel core wire. The electrodes are then stripped and dried in a baking oven. The coating composition extrudes evenly and easily over the core wire, leaving a coating of uniform thickness. The covering after baking is devoid of drying cracks, and the indentations due to the sinking of the electrodes on their carrying chains is reduced to a minimum. The welding characteristics of the coated rods are very good.

*Example II*

A welding rod is manufactured in the manner set forth in Example I above, except that the following electrode coating composition is applied to a stainless steel core wire:

| Dry ingredients: | Percent of total weight of dry ingredients |
|---|---|
| Calcium carbonate | 20–55 |
| Fluorspar | 5–23 |
| Potassium titanate | 5–20 |
| Magnesite | 1–6 |
| Mineral silicates | 5–15 |
| Ferro-manganese | 5–20 |
| Ferro-molybdenum | 2–8 |
| Ferro-silicon | 2–8 |
| Ferro-chromium | 2–8 |
| Copolymer of vinyl acetate and the reaction product formed by partially esterifying maleic anhydride with methyl alcohol (polyelectrolyte) | .01–2.0 |

To this dry mix sufficient liquid binder, as in Example I, is added to give proper consistency for extrusion.

This welding rod, like the electrode of Example I, has a minimum of cracks and handling defects. The coating composition extrudes easily and evenly.

*Example III*

A low-hydrogen type electrode is prepared in the manner set forth in Example I, above, using the following coating ingredients:

| Dry ingredients: | Percent of total weight of dry ingredients |
|---|---|
| Calcium carbonate | 41.9 |
| Fluorspar | 22.2 |
| Ferro-silicon | 5.7 |
| Silica sand | 3.8 |
| Ferro-manganese | 6.1 |
| Eyrite | 1.5 |
| Volclay | 2.3 |
| Titanium dioxide | 16.1 |
| Calcium salt of a hydrolyzed polymer of acrylonitrile (polyelectrolyte) | 0.4 |
| | 100.0 |

Sodium silicate liquid binder in the amount of 23% by weight of the dry ingredients is added to the above dry ingredients to give the proper consistency for extrusion. Extrusion is accomplished without difficulty, and an absence of drying cracks is noticed.

While I do not desire to be limited to the explanation of the phenomenon involved, it is believed that the polymeric water-soluble polyelectrolyte improves the mobility characteristics and extrudability of the electrode coating composition in primarily two ways. First, the polyelectrolyte promotes the aggregation of the finely-divided particles of the flux ingredients, thereby increasing the plasticity of the mix. Second, the polyelectrolyte absorbs water and forms a gel and this, too, increases the plasticity. Furthermore, it is believed that the polymeric polyelectrolyte acts as a lubricant over which the particles of the flux ingredients in the coating composition can readily slip and roll during the extrusion process.

Regardless of the reason therefor, as already stated above, the incorporation of a polymeric water-soluble electrolyte into the electrode coating composition improves the extrusion characteristics of the said composition and thereby facilitates extrusion. Coverings of uniform thickness are obtained with the core wire concentric therein. Drying and pressure cracks and chain indentations are minimized.

The ingredients of the coating compositions may, of course, be varied. Additions or omissions of certain welding flux materials can be made, and substitution of one such flux for another would be apparent to those familiar with the art. In addition, the proportions of the various welding flux ingredients can be changed. These variations would depend, in part at least, upon the nature of the welding deposition and the characteristics of the coating composition desired. The invention should not be limited except as defined in the claims.

What is claimed is:

1. A water containing plastic welding rod coating composition whose mobility for extrusion onto a welding rod is obtained without a detrimental increase in its water content, said composition comprising slag forming particles, a binder, and a polymeric water-soluble polyelectrolyte having a molecular weight of at least 10,000 and containing a substantially linear continuous carbon chain derived by the polymerization of an aliphatic unsaturated group.

2. A water containing plastic welding rod coating composition whose mobility for extrusion onto a welding rod is obtained without a detrimental increase in its water content, said composition comprising finely divided slag forming material, a binder and a polymeric water-soluble polyelectrolyte selected from the group consisting of polymers of acrylic acid, salts of polymers of acrylic acid, salts of hydrolyzed polymers of acrylonitrile, hydrolyzed polymers of acrylonitrile, polymers of methacrylic acid, salts of polymers of methacrylic acid, salts of hydrolyzed polymers of methacrylonitrile, hydrolyzed polymers of methacrylonitrile, salts of copolymers of unsaturated polycarboxylic acids and at least one other mono-olefinic monomer, salts of hydrolyzed copolymers of unsaturated polycarboxylic acid anhydrides and at least one other mono-olefinic monomer, hydrolyzed copolymers of unsaturated polycarboxylic acid anhydrides and at least one other mono-olefinic monomer, salts of copolymers of the partial alkyl esters of unsaturated polycarboxylic acids and at least one other mono-olefinic monomer, copolymers of unsaturated dicarboxylic acid anhydrides and at least one other mono-olefinic monomer, copolymers of the partial alkyl esters of unsaturated polycarboxylic acids and at least one other mono-olefinic monomer, salts of sulfonated polymers of hydrocarbons containing aliphatic unsaturation, polymers of amines containing aliphatic unsaturation, and polymers of amides containing aliphatic unsaturation.

3. A water containing plastic welding rod coating composition whose mobility for extrusion onto a welding rod is obtained without a detrimental increase in its water content, said composition comprising a slag former and a calcium salt of a hydrolyzed polymer of acrylonitrile.

4. A water containing welding rod coating composition whose mobility for extrusion onto a welding rod is obtained without a detrimental increase in its water content, said composition comprising a slag former and a sodium salt of a hydrolyzed polymer of acrylonitrile.

5. A water containing welding rod coating composition whose mobility for extrusion onto a welding rod is obtained without a detrimental increase in its water content, said composition comprising a slag former and a copolymer of vinyl acetate and the reaction product formed by partially esterifying maleic anhydride with methyl alcohol.

6. A water containing welding rod coating composition whose mobility for extrusion onto a welding rod is obtained without a detrimental increase in its water content, said composition comprising a slag former and a sulfonated polystyrene.

7. A welding rod comprising a metallic core and an adherent crack free coating in which said coating contains a slag former, a binder, water, and a small quantity of a polymeric water-soluble polyelectrolyte having a molecular weight of at least 10,000 and containing a substantially linear continuous carbon chain derived by the polymerization of an aliphatic unsaturated group, which polyelectrolyte improves the extrusion characteristics of said coating without further liquidous additions thereto and reduces shrinkage on drying.

8. A welding rod comprising a metallic core and an adherent coating, said coating containing a slag forming material, a binder and from about .01 to about 2.0 percent by weight of said coating of a polymeric water-soluble polyelectrolyte selected from the group consisting of polymers of acrylic acid, salts of polymers of acrylic acid, salts of hydrolyzed polymers of acrylonitrile, hydrolyzed polymers of acrylonitrile, polymers of methacrylic acid, salts of polymers of methacrylic acid, salts of hydrolyzed polymers of methacrylonitrile, hydrolyzed polymers of methacrylonitrile, salts of copolymers of unsaturated polycarboxylic acids and at least one other mono-olefinic monomer, salts of hydrolyzed copolymers of unsaturated polycarboxylic acid anhydrides and at least one other mono-olefinic monomer, hydrolyzed copolymers of unsaturated polycarboxylic acid anhydrides and at least one other mono-olefinic monomer, salts of copolymers of the partial alkyl esters of unsaturated polycarboxylic acids and at least one other mono-olefinic monomer, copolymers of unsaturated dicarboxylic acid anhydrides and at least one other mono-olefinic monomer, copolymers of the partial alkyl esters of unsaturated polycarboxylic acids and at least one other mono-olefinic monomer, salts of sulfonated polymers of hydrocarbons containing aliphatic unsaturation, polymers of amines containing aliphatic unsaturation, and polymers of amides containing aliphatic unsaturation.

9. A welding rod comprising a metallic core and an adherent coating, said coating containing a calcium salt of a hydrolyzed polymer of acrylonitrile.

10. A welding rod comprising a metallic core and an adherent coating, said coating containing a sodium salt of a hydrolyzed polymer of acrylonitrile.

11. A welding rod comprising a metallic core and an adherent coating, said coating containing a copolymer of vinyl acetate and the reaction product formed by partially esterifying maleic anhydride with methyl alcohol.

12. A welding rod comprising a metallic core and an adherent coating, said coating containing a sulfonated polystyrene.

13. A method of preparing a coated welding rod having a minimum of cracks and other defects which comprises incorporating a polymeric water-soluble polyelectrolyte having a molecular weight of at least 10,000 and containing a substantially linear continuous carbon chain derived by the polymerization of an aliphatic unsaturated group into a welding rod coating composition containing water thereby increasing the mobility of said composition for extrusion and reducing shrinkage thereof on drying, extruding said welding rod coating composition over a metallic core wire, to form a green, coated, welding rod, and baking said green, coated, welding rod to remove water therefrom.

14. A method of preparing a coated welding rod having a minimum of cracks and other defects which comprises incorporating a small but effective amount of a polymeric water-soluble polyelectrolyte selected from the group consisting of polymers of acrylic acid, salts of polymers of acrylic acid, salts of hydrolyzed polymers of acrylonitrile, hydrolyzed polymers of acrylonitrile, polymers of methacrylic acid, salts of polymers of polymers of methacrylic acid, salts of hydrolyzed polymers of methacrylonitrile, hydrolyzed polymers of methacrylonitrile, salts of copolymers of unsaturated polycarboxylic acids and at least one other mono-olefinic monomer, salts of hydrolyzed copolymers of unsaturated polycarboxylic acid anhydrides and at least one other mono-olefinic monomer, hydrolyzed copolymers of unsaturated polycarboxylic acid anhydrides and at least one other mono-olefinic monomer, salts of copolymers of the partial alkyl esters of unsaturated polycarboxylic acids and at least one other mono-olefinic monomer, copolymers of unsaturated dicarboxylic acid anhydrides and at least one other mono-olefinic monomer, copolymers of the partial alkyl esters of unsaturated polycarboxylic acids and at least one other mono-olefinic monomer, salts of sulfonated polymers of hydrocarbons containing aliphatic unsaturation, polymers of amines containing aliphatic unsaturation, and polymers of amides containing aliphatic unsaturation into a welding rod coating composition, extruding said welding rod coating composition over a metallic core wire thereby obtaining a green, coated, welding rod, and baking said green, coated, welding rod.

15. A method of preparing a coated welding rod having a minimum of cracks and other defects which comprises incorporating a polymeric water-soluble polyelectrolyte containing a calcium salt of a hydrolyzed polymer of acrylonitrile into a welding rod coating composition, extruding said welding rod coating composition over a metallic core wire thereby obtaining a green, coated, welding rod, and baking said green, coated, welding rod.

16. A method of preparing a coated welding rod having a minimum of cracks and other defects which comprises incorporating a polymeric water-soluble polyelectrolyte containing a sodium salt of a hydrolyzed polymer of acrylonitrile into a welding rod coating composition, extruding said welding rod coating composition over a metallic core wire thereby obtaining a green, coated, welding rod, and baking said green, coated, welding rod.

17. A method of preparing a coated welding rod having a minimum of cracks and other defects which comprises incorporating a polymeric water-soluble polyelectrolyte containing a copolymer of vinyl acetate and the reaction product formed by partially esterifying maleic anhydride with methyl alcohol into a welding rod coating composition, extruding said welding rod coating composition over a metallic core wire thereby obtaining a green, coated, welding rod, and baking said green, coated, welding rod.

18. A method of preparing a coated welding rod having a minimum of cracks and other defects which comprises incorporating a polymeric water-soluble polyelectrolyte containing a sulfonated polystyrene into a welding rod coating composition, extruding said welding rod coating composition over a metallic core wire thereby obtaining a green, coated, welding rod, and baking said green, coated, welding rod.

19. A welding rod comprising a metallic core and an adherent coating, said coating contains a slag former, a binder, water and from about 0.01 to about 2.0 percent by weight of a polymeric water-soluble polyelectrolyte having a molecular weight of at least 10,000 and containing a substantially linear continuous carbon chain derived by the polymerization of an aliphatic unsaturated group, which polyelectrolyte improves the extrusion characteristics of said coating without further liquidous additions thereto and reduces shrinkage on drying.

20. A method of preparing a shaped, baked, clay-containing article having a minimum of cracks and other defects which comprises blending an aqueous binder and a polymeric water-soluble polyelectrolyte having a molecular weight of at least 10,000 with a clay, extruding said blend into the desired shape, and baking the resulting extruded product to remove water therefrom.

21. A welding rod coating composition as defined in claim 1 wherein the amount of said polymeric water-soluble polyelectrolyte is from about 0.01 to about 2.0 percent by weight of said coating composition.

22. A welding rod coating composition as defined in claim 2 wherein the amount of said polymeric water-soluble polyelectrolyte is from about 0.01 to about 2.0 percent by weight of said coating composition.

23. In a welding rod coating composition comprising a mixture of finely divided slag forming material, a water-soluble binder, and a quantity of water, the improvement which comprises adding to said composition a small quantity of a polymeric water soluble polyelectrolyte having a molecular weight of at least 10,000 and containing a substantially linear continuous carbon chain derived by the polymerization of an aliphatic unsaturated group to improve the extrusion characteristics of the mixture without increasing its tendency to shrink upon drying.

References Cited in the file of this patent

UNITED STATES PATENTS

| | | |
|---|---|---|
| 1,374,711 | Armor | Apr. 12, 1921 |
| 1,778,392 | Kinkead | Oct. 14, 1930 |
| 1,871,257 | Cadwell | Aug. 9, 1932 |
| 1,926,090 | Friskey et al. | Sept. 12, 1933 |
| 2,158,984 | Lytle | May 16, 1939 |
| 2,213,390 | Franklin | Sept. 3, 1940 |
| 2,289,540 | Dittmar | July 14, 1942 |
| 2,452,493 | Rollason et al. | Oct. 26, 1948 |
| 2,625,471 | Mowry | Jan. 13, 1953 |
| 2,795,564 | Conn | June 11, 1957 |

FOREIGN PATENTS

| | | |
|---|---|---|
| 513,267 | Great Britain | Oct. 9, 1939 |